United States Patent [19]

Harris et al.

[11] Patent Number: 5,091,161
[45] Date of Patent: Feb. 25, 1992

[54] PRODUCTION OF PURE MAGNESIUM CHLORIDE SOLUTION FROM SILICEOUS MAGNESIUM MINERALS

[75] Inventors: G. Bryn Harris, Beaconsfield; John G. Peacey, Lancaster, both of Canada

[73] Assignee: Noranda, Inc., Toronto, Canada

[21] Appl. No.: 570,301

[22] Filed: Aug. 20, 1990

Related U.S. Application Data

[63] Continuation-in-part of Ser. No. 279,812, Dec. 5, 1988, abandoned, which is a continuation-in-part of Ser. No. 102,377, Sep. 29, 1987, Pat. No. 4,800,003.

[30] Foreign Application Priority Data

Nov. 21, 1986 [CA] Canada .................................. 523608

[51] Int. Cl.$^5$ .............................................. C01F 5/30
[52] U.S. Cl. ...................................... 423/163; 423/164; 423/167; 423/497
[58] Field of Search ............... 423/167, 157, 163, 164, 423/160, 497, 498, 399

[56] References Cited

U.S. PATENT DOCUMENTS

| | | | |
|---|---|---|---|
| 2,216,402 | 10/1940 | Muller | 423/163 |
| 2,384,009 | 9/1945 | Brandenburg | 423/163 |
| 2,549,798 | 4/1951 | Gee et al. | 423/167 |
| 3,615,181 | 10/1971 | Bauman | 23/91 |
| 4,100,254 | 7/1978 | Grohmann et al. | 423/163 |
| 4,148,862 | 4/1979 | Fugleberg et al. | 423/339 |
| 4,289,736 | 9/1981 | Lalancette | 423/167 |

OTHER PUBLICATIONS

*Hydrogen Ions Their Determination and Importance in Pure and Industrial Chemistry*, Britton Hubert T. S., 4th Ed., vol. II, D. Van Nostrand Co., Inc., 1986.

*Primary Examiner*—Michael Lewis
*Assistant Examiner*—Stephen G. Kalinchak
*Attorney, Agent, or Firm*—Fleit, Jacobson, Cohn, Price, Holman & Stern

[57] ABSTRACT

A process for the production of pure magnesium chloride liquor from siliceous magnesium minerals comprises the steps of continuously leaching the siliceous magnesium mineral with a hydrochloric acid solution at a temperature higher than 50° C. but below the boiling point and in such a manner as to maintain the pH of the slurry below 1.5 to prevent the formation of silica gel, continuously reacting such slurry with a reactive magnesia in order to raise the pH to 4.0–7.0 to precipitate substantially all the impurities from solution while preventing silica gel formation, and performing a solid/liquid separation of the slurry on suitable filtration equipment to obtain pure magnesium chloride liquor.

9 Claims, 1 Drawing Sheet

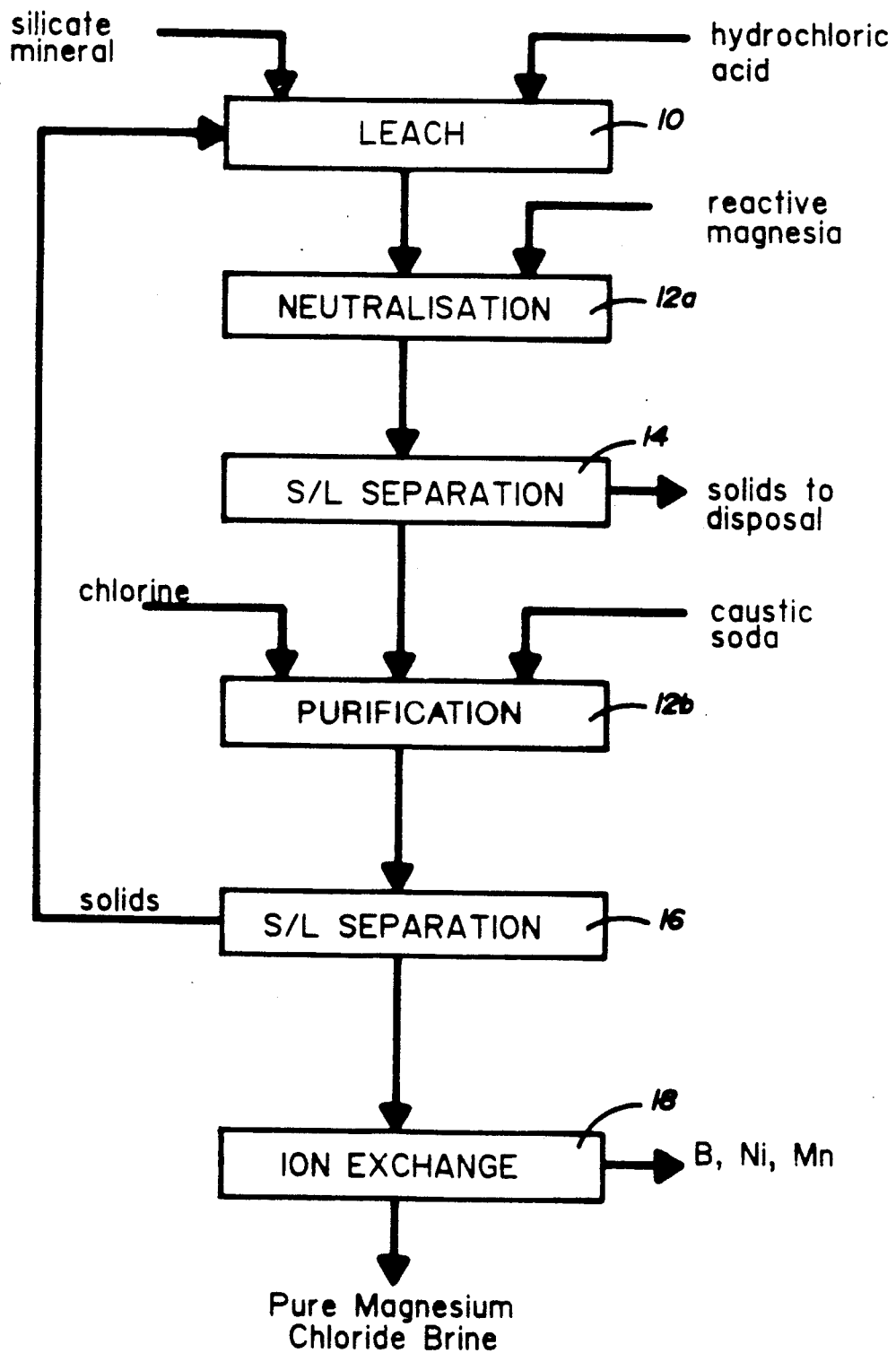

PRODUCTION OF PURE MAGNESIUM CHLORIDE SOLUTION FROM SILICEOUS MAGNESIUM MINERALS

This is a continuation-in-part of U.S. application No. 279,812 filed Dec. 5, 1988, now abandoned, which is a continuation-in-part of U.S. application No. 102,377 filed Sept. 29, 1987.

This invention relates to the production of a high purity magnesium chloride solution (hereinafter also referred to as a magnesium chloride liquor or brine) from siliceous magnesium containing minerals, and more particularly from serpentine mineral which is a component of asbestos tallyings.

Pure magnesium chloride liquors are employed as feedstock for the production of pure magnesium metal via the electrolysis of molten magnesium chloride in electrolytic cells, such as practiced by Dow Chemical Company and Norsk Hydro. The conventional methods of generating magnesium chloride brines for the current electrolytic processes are the evaporation of salt lake water or recovery from sea water. Based on available information, it is believed that a process for the production of high purity magnesium chloride brine from siliceous magnesium minerals has not been previously developed. According to Nagamori et al. (CIM Bulletin, Vol. 73 (824), 1980 and Vol. 75 (838), 1982), the only commercial use of serpentine is found in dry processes such as the production of fused magnesium phosphate fertilizer. The major drawback to the use of silicate minerals is the formation of silica gels which hitherto has prevented the recovery of magnesium from such sources, although there are several instances of processes being proposed (Nagamori et al. above, Houston, Trans. A.I.M.E. Vol. 182, 1949, Bengtson et al., Canadian Patent 791,613, Aug. 6, 1968, Butt et al., U.S. Pat. No. 2,398,493, Apr. 16, 1946 and Gee et al., U.S. Pat. No. 2,549,798, Apr. 24, 1951). However, not one of these processes has operated commercially. These processes all stress the difficulty of extracting magnesium from silicate minerals, and of the problems encountered with the formation of siliceous residues which are extremely difficult to filter. Both Houston and Butt et al., for example, stress the need to operate at as high a temperature as possible (close to 100° C.) in order to maximize magnesium extraction and avoid the formation of a gelatinous form of silica. Bengtson et al. require that the temperature be raised to the boiling point in order to generate a slurry with satisfactory filtration characteristics. The degree of acid strength acceptable in these processes varies considerably, from 20% up to concentrated acid (38%). At such acid strengths and high temperatures (>90° C.), there is a considerable loss of hydrogen chloride reactant in the acid mist. This loss minimizes the reaction efficiency, and necessitates the use of expensive, corrosion-proof gas recovery systems. The process proposed by Gee et al. makes some effect to control acid, but it is, of necessity, a batch process, since control of acid strength by careful addition of the right calculated amount of magnesium materials has to be made.

All the processes cited generate an impure brine. Nagamori et al. recommend the initial calcining of the silicate mineral to make it more reactive, and to convert it to a form more easily filtered. Purification is effected by raising the pH to 8-9 by the addition of further calcine. Butt et al. adopted a similar approach, adding calcined silicate mineral to effect some degree of purification, and further adding a source of magnesia to raise the pH to 7.6 to effect final purification. This method of purification is very inefficient, magnesium utilization being only 20-50% at these pH values, and furthermore, the brines are prone to hydrolysis, precipitating magnesium hydroxy-chlorides. The net effect, in raising the pH to such high levels with magnesia, is to considerably reduce the overall magnesium extraction to unacceptable levels. The use of magnesia for purification is very expensive and it is for such reasons that none of the proposed processes have attained commercialization.

It is the object of the present invention to provide a method whereby magnesium can be extracted into a high purity brine from silicate minerals without the formation of a silica gel, without boiling the slurry and in a continuous manner. Such process is believed to have considerable economic advantages over more conventional methods of generating magnesium chloride brines, such as the evaporation of salt lake water or recovery from sea water.

The process in accordance with the present invention comprises the steps of continuously leaching the siliceous magnesium mineral with a hydrochloric acid solution at a temperature higher than 50° C. but below the boiling point and in such a manner as to maintain the pH of the slurry below 1.5 to prevent the formation of silica gel, continuously reacting such slurry with a reactive magnesia in order to raise the pH to 4.0-7.0 to precipitate substantially all the impurities from solution while preventing silica gel formation, and performing a solid/liquid separation of the slurry on suitable filtration equipment to obtain pure magnesium chloride liquor.

Continuous leaching is preferably performed by feeding the siliceous magnesium mineral and/or the hydrochloric acid solution to a reactor at such a rate as to maintain the pH of the slurry below 1.5.

The hydrochloric acid solution is preferably 20-25% HCl and the temperature of the slurry in the range of 50-105° C., most preferably between 80-90° C. The pH of the slurry is preferably maintained in the range of 0.7-0.8.

The reactive magnesia may be calcined magnesite or magnesium oxide generated by spray roasting of magnesium chloride.

Filtration may be performed at about pH 4.0-4.5 to remove the bulk of the impurities followed by addition of caustic soda to raise the pH from 4.0-4.5 to 6.0-7.0 to remove virtually all the impurity elements whilst minimizing the co-precipitation of magnesium. The solids precipitated with caustic soda ar preferably returned to the leaching stage for the recovery of co-precipitated magnesium. Chlorine gas is preferably sparged through the slurry prior to the addition of caustic soda to oxidize any remaining iron to the ferric state and also oxidize most of the manganese to solid manganese dioxide which can be removed by filtration.

The magnesium chloride liquor is then further purified by ion-exchange to remove trace amounts of impurities such as boron or nickel.

BRIEF DESCRIPTION OF DRAWINGS

The invention will now be disclosed, by way of example, with reference to the accompanying drawing which is a general flowsheet of the process in accordance with the invention.

Silicate mineral, such as serpentine which is found in the tailings resulting from the mining and recovery of asbestos, is treated in a two-stage leach and purification flowsheet. In the first stage 10, hydrochloric acid (which can be generated on site if electrolytic magnesium is being produced from the magnesium chloride brine) is combined with wash water to give acid of strength 20-25%, and the silicate material added to this acid to raise the pH to 0.7-0.8 at a temperature of 80-90° C. It is understood that acid of any suitable concentration may be used, being dependent upon the level of magnesium in the feed material. Provided the temperature is higher than 50° C., the reaction proceeds at an acceptable rate, the optimum temperature being in the range of 80-90° C. Higher temperatures result in the loss of significant quantities of acid mist. The pH must be maintained below 1.5 in order to prevent the formation of silica gel, from which it is impossible to recover any significant quantity of leach solution. The optimum pH for extraction of magnesium and maximum utilization of silicate material is 0.7-0.8.

During the leaching of the silicate mineral, most of the iron, chromium, copper, zinc, manganese, aluminum, nickel, boron and other base metals are co-extracted and report to the leach solution. In the neutralization stage 12a, it has been found that by rapidly raising the pH to 4.0-4.5 using a reactive form of magnesia, either a calcined magnesite or magnesia generated by spray roasting of the brine produced in this flowsheet, a large proportion of the impurities can be precipitated, and silica gel formation avoided. The reactive magnesia can also be used to raise the pH to 6.0-7.0, to effect virtual complete precipitation of the impurity elements, but the efficiency of utilization drops off rapidly at pH >5.0. In a flowsheet which produces magnesium metal via electrolysis, however, it is preferable to use caustic soda to raise the pH from 4.0-4.5 to 6.0-7.0, preferably 6.0 as illustrated in purification stage 12b, since sodium is required as flux in the electrolytic cell, and the efficiency of utilization of caustic soda as a neutralizing agent is close to one hundred percent. Neutralization to pH >7.0 results in the co-precipitation of appreciable quantities of magnesium hydroxy-chlorides, hence the preferred pH is 6.0, this being sufficiently high to remove virtually all of the impurity elements, whilst minimizing the co-precipitation of magnesium. Chlorine gas, generated during the electrolysis of molten magnesium chloride, can be sparged through the solution prior to the addition of caustic soda. This has the advantage of oxidizing any remaining iron to the ferric state, thereby making pH control at 6.0 very much simpler, and also of oxidizing most of the manganese to solid manganese dioxide, which can be removed by filtration. Chlorine is the preferred oxidant in a flowsheet producing electrolytic magnesium, but other oxidants such as hydrogen peroxide can be used with equal facility.

It is preferable to effect filtration at pH 4.0-4.5 as illustrated by S/L separation stage 14, prior to addition of the caustic soda solution, since this removes the bulk of the solids, and has also been found to reduce the caustic requirement. The solids produced at pH 6.0 contain a significant amount of magnesium, and these can be separated in stage 16 and returned to the leaching stage 10 for the recovery of the magnesium.

Remaining trace amounts of in particular boron and nickel can be removed by the use of ion exchange methods in ion exchange stage 18. It has been found that the Dow resin XFS-4195 is very effective in removing nickel to <0.5 mg/L (and at the same time removes any trace amounts of manganese to <0.5 mg/L), and that boron can be removed to similar levels by use of the Rohm and Haas resin Amberlite 743. Ion exchange has not been used previously to purify magnesium chloride brines. The ion exchange resin has been used to remove nickel from cobalt sulphate solutions, but this is its first application in chloride medium. Boron is normally removed via solvent extraction, as disclosed by Folkestad et al. (U.S. Pat. No. 3,855,392, Dec. 17, 1974). Ion exchange is much more preferable for the removal of trace impurities from large solution volumes than solvent extraction, since it is much easier to operate.

The resulting magnesium chloride liquor is exceptionally pure, containing <1 mg/L of any of the significant impurities listed above.

EXAMPLE 1

150 g of asbestos tailings (23.9% Mg, 6.42% Fe, 34.3% $SiO_2$) were added to 0.5 L of 20% hydrochloric acid at 85° C. over a period of 120 minutes. A pH of 0.74 was attained, giving a magnesium extraction of 87.2% and iron extraction of 82.4%. The pH of the slurry was then rapidly raised to 4.51 with the addition of 7.1 g of spray roasted magnesia (60.1% Mg), and the corresponding overall magnesium and iron extractions were 85.6% and 8.3% respectively. Addition of caustic soda solution to the pH 4.51 filtrate to raise the pH to 6.5 gave a final solution analyzing 65.1 g Mg/L, 58 mg Mn/L, and <1 mg/L Fe, Cr, Al, Ni and Cu.

EXAMPLE 2

Asbestos tailings (20.0% Mg, 4.83% Fe, 0.18% Ni, 0.057% Mn) were added in increments to 0.5 L of concentrated (36.5%) hydrochloric acid at 80° C. At pH 0, the extractions of magnesium, iron, nickel and manganese were 90.3%, 93.3%, 94.8% and 75.9% respectively, and at pH 1.0 were 86.6%, 90.1%, 91.9% and 73.1% respectively. Filtration at both pH values was excellent, resulting in cakes containing 35.3% moisture at pH 0, and 43.7% at pH 1.0. Addition of further tailings increased the pH slowly, until a value of pH 1.68 was attained, at which point the slurry became very viscous and then formed a gel. Addition of water or acid did not disperse the gel, and no liquor could be recovered from the gel. This test clearly demonstrates that gels are relatively easily formed when leaching silicate minerals.

EXAMPLE 3

140 g of the same asbestos tailings as used in example 1 were added to 0.5 L of 20% hydrochloric acid at 85° C., to raise the pH of the slurry to 0.73. Magnesium and iron extractions were 87.8% and 86.3% respectively. The pH of the slurry was then raised to 4.50 by the addition of 7.0 g of calcined magnesite concentrate (60.0% Mg), and the resultant slurry filtered. Magnesium and iron extractions were 84.4% and 13.1% respectively. Addition of caustic soda solution to raise the final pH to 6.5 gave a final solution analyzing 64.9 g Mg/L, 80 mg Mn/L, 14 mg Ni/L, and <1 mg/L each of Fe, Cr, Al and Cu.

These examples demonstrate that good magnesium extraction and a pure magnesium chloride brine can be obtained by the two-stage leach and purification flowsheet, without the formation of silica gels. The process will now be further demonstrated by reference to the following example of a pilot scale continuous test.

EXAMPLE 4

Asbestos tailings (23.7% Mg, 5.1% Fe) were added continuously at a rate of 400–410 g/minute to the first of three 100-L tanks in a cascade. Concentrated hydrochloric acid (0.74 L/minute) and wash water (0.75 L/minute) were also simultaneously continuously added, the rates of acid and wash water addition being controlled by the pH of the slurry in the third tank (0.69), and the temperature was maintained at 80–85° C. Magnesium extraction in this cascade was 86.0%. Calcined magnesite (50.3% Mg, a source of reactive magnesia) was added continuously to the fourth tank of the cascade, at such a rate (23.1 g/minute) as to maintain the pH of the fifth tank at 4.0. Magnesium extraction from the magnesite averaged 91.5%, giving an overall magnesium extraction of 86.8%.

The following two examples demonstrate the removal of residual trace amounts of nickel and boron by the use of ion exchange.

EXAMPLE 5

Magnesium chloride brine, generated in the pilot testing described in example 4, containing 61.9g Mg/L and 137 mg B/L, was passed through a column, containing the ion exchange resin Amberlite 743, at a flowrate of five bed volumes per hour (5 BV/h) at ambient temperature. The analysis of the solution exiting the column was <0.2 mg B/L for the first four bed volumes, and the resin was not fully loaded until the passage of 60 BV. After 60 BV, the dry resin analyzed 0.77% B. It was found that the resin was very easily stripped by 5 BV of 10% HCl, and the strip solution concentrated to 1.75 g B/L.

EXAMPLE 6

A further sample of magnesium chloride brine from the pilot testing of example 4, containing 61.9 g Mg/L and 34.0 mg Ni/L, was passed through an ion exchange column containing the resin XFS-4195, at a flowrate of 10 BV/h. Analysis of the solution exiting the column was <0.5 mg Ni/L for the first 60 BV, and the resin was not fully loaded even after the passage of 1000 BV of feed solution. Stripping of the partially loaded resin (6.31% Ni, 0.036% Mg, 0.81% Mn) was effected by 5 BV of 10% HCl, generating a solution analyzing 6.0 g Ni/L.

Although widespread throughout the world, silicate minerals of magnesium are not used as feedstock for the production of either high purity magnesia or high purity magnesium metal. The major drawback to the use of silicate minerals is the ease with which silica gels are produced. The process herein described circumvents this problem by use of the above disclosed continuous two-stage leach and purification process. Use of the ion exchange resins, whilst known technology in other fields, is not known to be used to generate ultra-pure magnesium chloride liquors. The process in accordance with the present invention uses a very low cost feed, and converts an environmental liability, namely asbestos tailings (which contains silicate minerals of magnesium, such as serpentine), into a valuable product (magnesium chloride) and an environmentally acceptable leach residue.

We claim:

1. A process for the production of a magnesium chloride liquor from siliceous magnesium minerals comprising the steps of:
   (a) continuously adding the siliceous magnesium mineral and a hydrochloric acid solution to a first stage reaction vessel and reacting the siliceous magnesium mineral and the hydrochloric acid solution to form a slurry at a temperature higher than 50° C. but below the boiling point of said slurry and in such a manner as to maintain the pH of the slurry below 1.5 thereby extracting magnesium from the siliceous magnesium mineral and preventing the formation of silica gel;
   (b) continuously transferring the slurry from step (a) into a second stage reaction vessel and continuously adding a reactive magnesia to said second stage reaction vessel to react with said slurry and to maintain the pH of the slurry in the range of 4.0–7.0 in the second reaction vessel thereby precipitating substantially all the impurities from said slurry while preventing silica gel formation; and
   (c) continuously transferring the slurry from step (b) to filtration equipment and performing a solid/liquid separation of the slurry from step (b) on said filtration equipment to obtain a magnesium chloride liquor.

2. A process as defined in claim 1, wherein said solid/liquid separation is performed at about pH 4.0–4.5 to remove the bulk of the impurities followed by the addition of caustic soda to raise the pH to 6.0–7.0 to remove substantially all of the impurity elements whilst minimizing the co-precipitation of magnesium.

3. A process as defined in claim 2, wherein the solids precipitated by caustic soda are returned to said first stage reaction vessel for the recovery of co-precipitated magnesium.

4. A process as defined in claim 2, wherein chlorine gas is sparged through the slurry prior to the addition of caustic soda to oxidize any remaining iron to the ferric state and also oxidize most of any remaining manganese to solid manganese dioxide which can be removed by filtration.

5. A process as defined in claim 1, further comprising the step of purifying the magnesium chloride liquor by ion-exchange to remove trace amounts of boron, nickel or manganese impurities.

6. A process as defined in claim 1, wherein the hydrochloric acid solution is about 20–25% HCl.

7. A process as defined in claim 1, wherein the temperature of the slurry in step a) is in the range of 50–105° C.

8. A process as defined in claim 7, wherein the temperature of the slurry in step a) is in the range of 80–90° C.

9. A process as defined in claim 1, wherein the pH of the slurry in step a) is maintained in the range of 0.7–0.8.

* * * * *